(12) United States Patent
Morris et al.

(10) Patent No.: US 6,629,100 B2
(45) Date of Patent: Sep. 30, 2003

(54) NETWORK-BASED PHOTOSHARING ARCHITECTURE FOR SEARCH AND DELIVERY OF PRIVATE IMAGES AND METADATA

(75) Inventors: Robert Paul Morris, Raleigh, NC (US); Hugh Svendsen, Apex, NC (US); Patricia Scardino, Apex, NC (US)

(73) Assignee: IPAC Acquisition Subsidiary I, LLC, Peterborough, NH (US)

( * ) Notice: Subject to any disclaimer, the term of this patent is extended or adjusted under 35 U.S.C. 154(b) by 0 days.

(21) Appl. No.: 10/122,082

(22) Filed: Apr. 12, 2002

(65) Prior Publication Data

US 2003/0063771 A1 Apr. 3, 2003

Related U.S. Application Data

(63) Continuation-in-part of application No. 09/968,393, filed on Oct. 1, 2001.

(51) Int. Cl.[7] ............................................. G06F 17/30
(52) U.S. Cl. .................. 707/10; 707/1; 707/2; 707/3; 707/9; 709/202; 709/217; 709/226
(58) Field of Search ........................ 207/1–10; 209/202, 209/217, 226

(56) References Cited

U.S. PATENT DOCUMENTS

| | | | | |
|---|---|---|---|---|
| 6,151,624 A | * | 11/2000 | Teare et al. ................. | 709/217 |
| 6,360,254 B1 | * | 3/2002 | Linden et al. ............... | 709/219 |
| 6,463,433 B1 | * | 10/2002 | Baclawski ..................... | 707/5 |
| 6,516,337 B1 | * | 2/2003 | Tripp et al. .................. | 709/202 |
| 6,564,263 B1 | * | 5/2003 | Bergman et al. ............ | 709/231 |

* cited by examiner

Primary Examiner—Greta Robinson
Assistant Examiner—Debbie M. Le
(74) Attorney, Agent, or Firm—Sawyer Law Group LLP

(57) ABSTRACT

A method for executing searches for resources that span more than one private resource repository in a restricted-access resource sharing system is disclosed. The system includes at least one server node and multiple peer nodes connected to a network. Resources, such as data digital images, may be retrieved from the nodes based by issuing queries containing terms matching the metadata associated with the resources. The method includes maintaining storage of resources and associated metadata on respective peer nodes, wherein the associated metadata is based on at least one metadata vocabulary. Each of the peer nodes is allowed to indicate to the server that the metadata vocabularies associated with the resources are designated as private, thereby becoming a restricted access peer node. If a first restricted access peer node specifies to the server which metadata vocabularies the first restricted access peer node supports, a first level of privacy is provided whereby search queries received by the server that use the specified metadata vocabularies are passed to the first respective restricted access peer nodes for processing, while searches that do not use the specified vocabularies are processed by the server. If the first restricted access peer node does not specify to the server which metadata vocabularies the first restricted access peer node supports, a second level of privacy is provided whereby search queries received by the server are passed to the first respective restricted access peer nodes for processing.

10 Claims, 5 Drawing Sheets

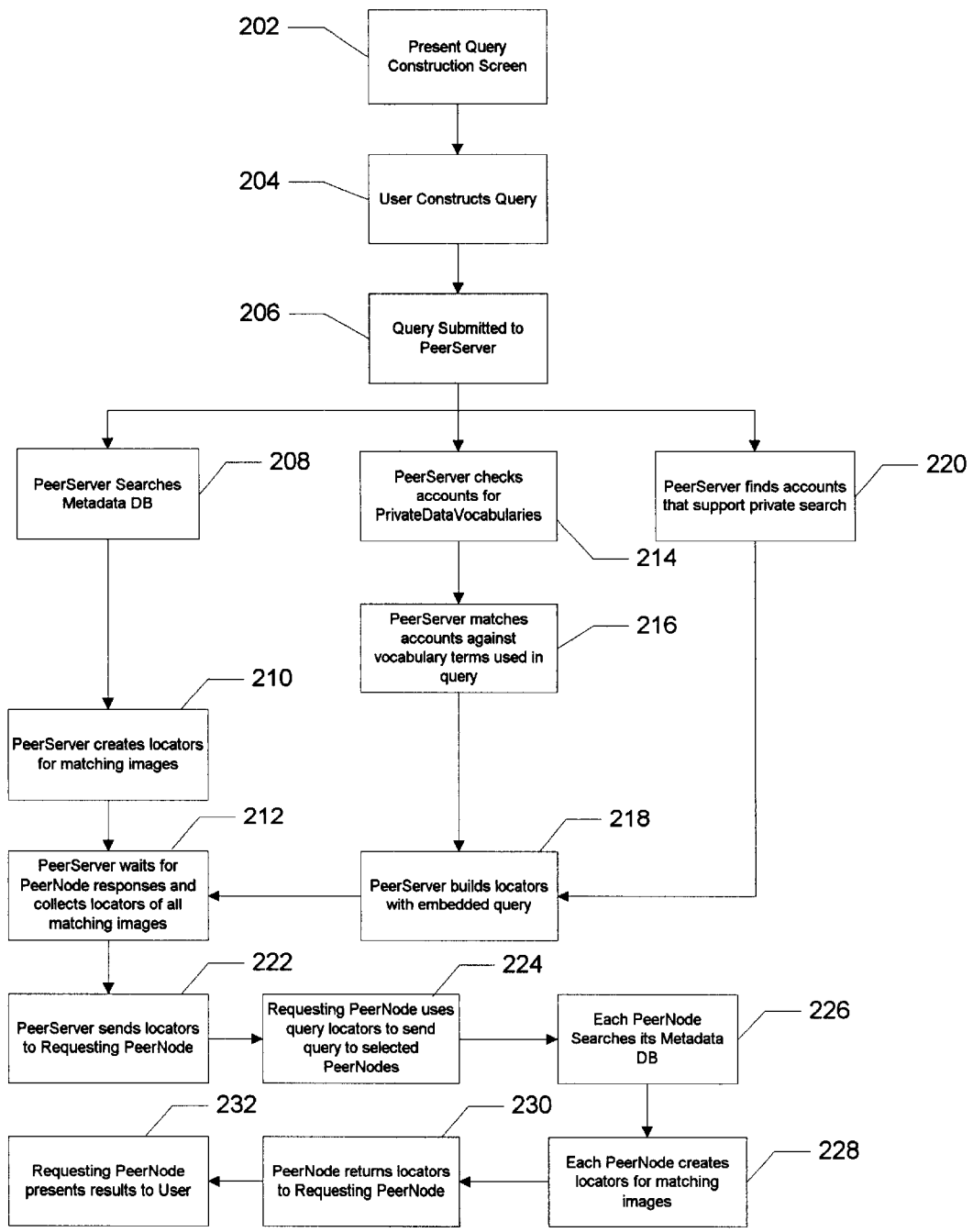
FIG. 4  Private Metadata Search Optimized For PeerNodes Unprotected by Firewalls

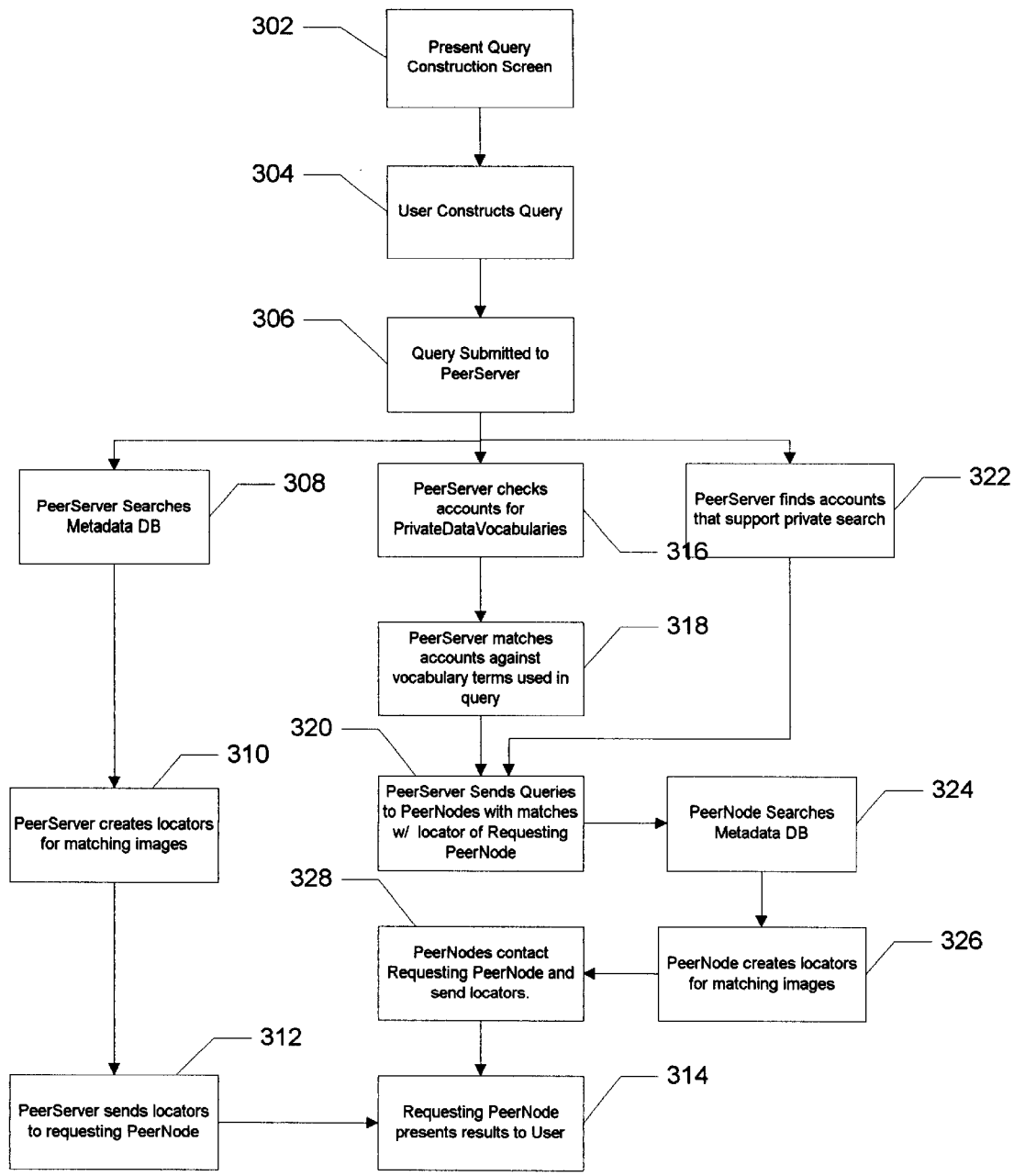
FIG. 5  Private Metadata Search Optimized For PeerNodes Protected by Firewalls

NETWORK-BASED PHOTOSHARING ARCHITECTURE FOR SEARCH AND DELIVERY OF PRIVATE IMAGES AND METADATA

CROSS-REFERENCE TO RELATED APPLICATIONS

The present invention is a Continuation-In-Part of U.S. application Ser. No. 09/968,393 entitled "NETWORK-BASED PHOTOSHARING ARCHITECTURE" (2215P/P214) filed on Oct. 1, 2001, which is assigned to the Assignee of the present application and herein incorporated by reference.

FIELD OF THE INVENTION

The present invention relates to electronic storage and sharing of digital images, and more particularly to an improved photosharing architecture.

BACKGROUND OF THE INVENTION

Over the past several years, photosharing has become widely accepted by photo enthusiasts. Many websites currently exist that allow users to upload digital images to the site for storage on a server and for viewing by others over the Internet. Metadata, which is typically associated with an image or group or images, is typically supported by photosharing sites. One of the most significant inhibitors of photo sharing on the Web today, however, is the lack of privacy available for the images and their associated metadata.

There are currently several available options for sharing images on the web today. One option is for a user or a small group of users to build their own site for sharing, and restrict access to the site through the traditional access control mechanisms available. This can be costly and is beyond the skills of most people, however. Further, there is currently no efficient mechanism that allows a user to search for images across more than one of these "private" sites.

Another option is for individuals and groups to host their own images on some of the current peer-to-peer networks, such as Yaga™ without incurring great cost or requiring significant technical expertise in setting up and maintaining a web site. Some of these peer-to-peer systems provide limited support for searching using a small set of fixed metadata fields. However, the images discoverable on the current peer-to-peer networks are public as are their metadata, so access is available to all users on the system.

A further option is for users and small user groups to share their images using a traditional web-based photosharing services. These services offer a limited amount of privacy. Through traditional access control mechanisms, a user or group can specify who may see the images and associated metadata. Some of these sites provide search facilities that allow searching on the limited amount of metadata they support. The current photosharing services, however, have possession of both the images and metadata (copies of them, at least). In this sense, the images and metadata are not private. In fact, the user agreements for most of these sites take little responsibility for keeping the images and metadata private, in most cases specify that once the images have been uploaded to the photosharing site, both the images and the metadata become the property of the photosharing site.

Accordingly, there is a need for a system that allows users and groups to share images and restrict access to the images and metadata. Further, the system should allow users to execute searches that span more than one private image storage site in a manner that restricts access to the images and data according to the image owner's wishes. The present invention addresses such a need.

BRIEF DESCRIPTION OF THE DRAWINGS

FIGS. 3–5 are flow charts illustrating three processes for searching for resources located throughout the system using metadata, while at the same time ensuring the privacy of private metadata on the peer nodes.

SUMMARY

Figure 1:
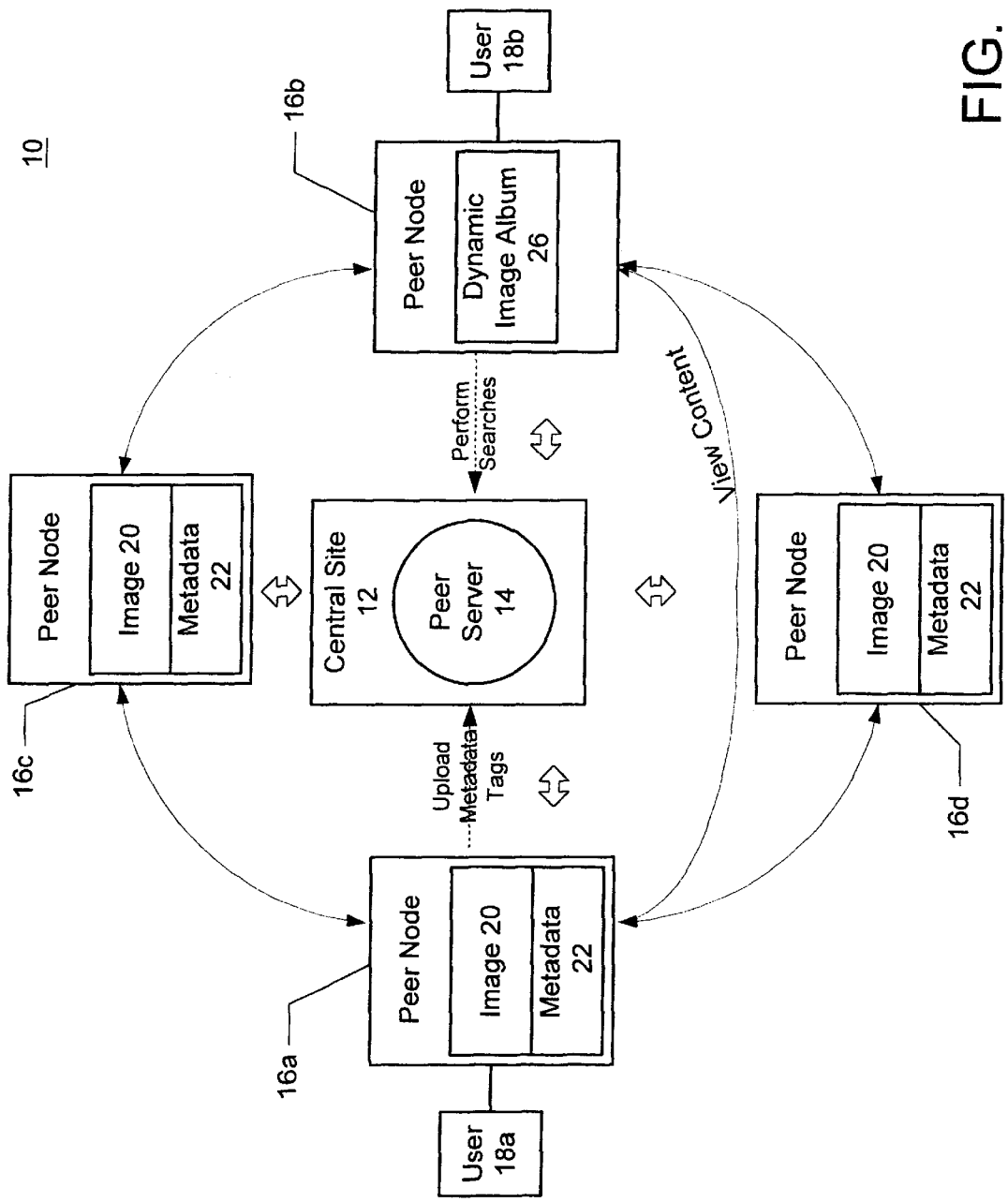
FIG. 1 is a block diagram illustrating a network-based photosharing system in accordance with a preferred embodiment of the present invention.

The present invention is a method for executing searches for resources that span more than one private resource repository in a restricted-access resource sharing system. The system includes at least one server node and multiple peer nodes connected to a network. Resources, such as data digital images, may be retrieved from the nodes based by issuing queries containing terms matching the metadata associated with the resources. The method includes maintaining storage of resources and associated metadata on respective peer nodes, wherein the associated metadata is based on at least one metadata vocabulary. Each of the peer nodes is allowed to indicate to the server that the metadata vocabularies associated with the resources are designated as private, thereby becoming a restricted access peer node. If a first restricted access peer node specifies to the server which metadata vocabularies the first restricted access peer node supports, a first level of privacy is provided whereby search queries received by the server that use the specified metadata vocabularies are passed to the first respective restricted access peer nodes for processing, while searches that do not use the specified vocabularies are processed by the server. If the first restricted access peer node does not specify to the server which metadata vocabularies the first restricted access peer node supports, a second level of privacy is provided whereby search queries received by the server are passed to the first respective restricted access peer nodes for processing.

According to the method and system disclosed herein, the present invention provides users with a way to maintain privacy of their metadata, while allowing searches for images based on that metadata to be performed across all the nodes in the system.

DETAILED DESCRIPTION OF THE INVENTION

The present invention relates to a method and system for providing a web-based, peer-to-peer photosharing service. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention will be described in terms of a preferred embodiment where the targets to which the metadata is applied are digital images, although the metadata may be applied to any type of digital resource.

Co-pending application Ser. No. 09/968,393 provides a web-based, peer-to-peer photosharing service in which all workstations and computers in the network store their own images and act as servers to other users on the network. The photosharing service includes at least one central server, known as the peer server, that is available to users through client computers or peer nodes. The photosharing service allows users to maintain storage of their images on their own computers, and enables users and their guests to search for images across the other user's peer nodes based on a wide array of metadata supported by the system. The advantage of the service is that it frees users from having to setup their own independent photosharing site, solves storage problems encountered by photosharing service providers, and also solves photosharing usability problems encountered by users of the service.

FIG. 1 is a block diagram illustrating a peer-to-peer (P2P) photosharing system in accordance with a preferred embodiment of the present invention. According to the present invention, the system 10 includes a central photosharing website 12 that includes a peer server 14, and multiple peer nodes 16. The peer server 14 and each of the peer nodes 16 are capable of communicating with one another over a network, such as the Internet. In a preferred embodiment, users 18 may also access the central site 12 from devices or clients (not shown) that are not peer nodes 16, via the use of a standard web browser.

In a preferred embodiment, the peer nodes 16 may each represent either a website or a computer, and typically store the digital images 20 of a particular user 18. Although the user interface for the peer nodes 16 may be implemented in a number of different ways, in a preferred embodiment the peer user interface is implemented as a web browser, but alternately it may be an application specifically designed for the system 10. Each peer node 16 may store the images 20 of more than one user. For example, two family members which share a home PC, but manage their images separately may maintain separate accounts with the system 10 on the shared PC. The digital images 20 are stored as image files that include image data. Each image also has metadata 22 associated with it that describe and categorize the image. The metadata 22 may be associated with the images 20 by the user 18 or automatically by the peer node 16 as described below. In addition, some or all of the metadata 22 may be associated with the image 20 by a digital camera at the time of image capture. Each image 20 may also be associated with a particular type of metadata, which is a smaller representation of the image data, called a thumbnail image 24.

The photosharing service 10 is in contrast to the traditional photosharing model where the user 18 would post digital images by uploading the images from his or her computer to a webserver for storage in a static album. Instead, in the previous embodiment, the photosharing service 10, the peer nodes 16 maintain storage of the actual image data and only the metadata 22 (and, in particular, the thumbnail image 24) for each image are uploaded to the peer server 14. This allows users to construct queries that search through the metadata 22 stored at the peer server 14 to find images 20 of interest (or groups of images, albums, sound clips, movies, whatever has metadata).

For example, users 18 may dynamically create image albums 26 for viewing the images 20 by submitting search criteria that are based on metadata 22. In FIG. 1 for example, assume that user 18a has shared images 20 on the central site 12 by uploading the metadata 22 to the peer server 14. User 18b may then submit a search to the peer server 14 to view images 20 having metadata that matches the search criteria. In response, the peer server 14 returns a list of image locators (e.g., URLs) for images 20 matching the search criteria to peer node 16b, and the peer node 16b sends requests using the image locators to retrieve the matching images as needed.

One drawback with caching the metadata 22 on the server 14 where the searches are performed is that users 18 loose control over their metadata 22. The present invention solves this problem by providing the photosharing system 10 with an extension that allows a peer node 16 or a group of peer nodes 16 to store images 20 and metadata 22 without caching any metadata 22 including thumbnails at the peer server 14. This extension also enables users to search for images 20 on one or more of these peer nodes 16 using metadata vocabularies associated with these private images, as described below.

According to the present invention, the owner of a peer node has two levels of privacy that he/she can use to maintain privacy of his/her metadata 22 and images 20. In both levels of privacy, the images 20 and metadata 22 are not cached on the peer server 14, and the peer node 16 indicates to the server 14 that the peer node 16 contains private metadata 22 and images 20. In the first level of privacy, the peer nodes 16 indicate to the peer server 14 which metadata 22 vocabularies the image 20 it stores makes use of. In the second level of privacy, the peer server 14 has no knowledge of which metadata 22 vocabularies the image 20 on the peer node uses, providing a higher level of security for the peer node.

Figure 2:
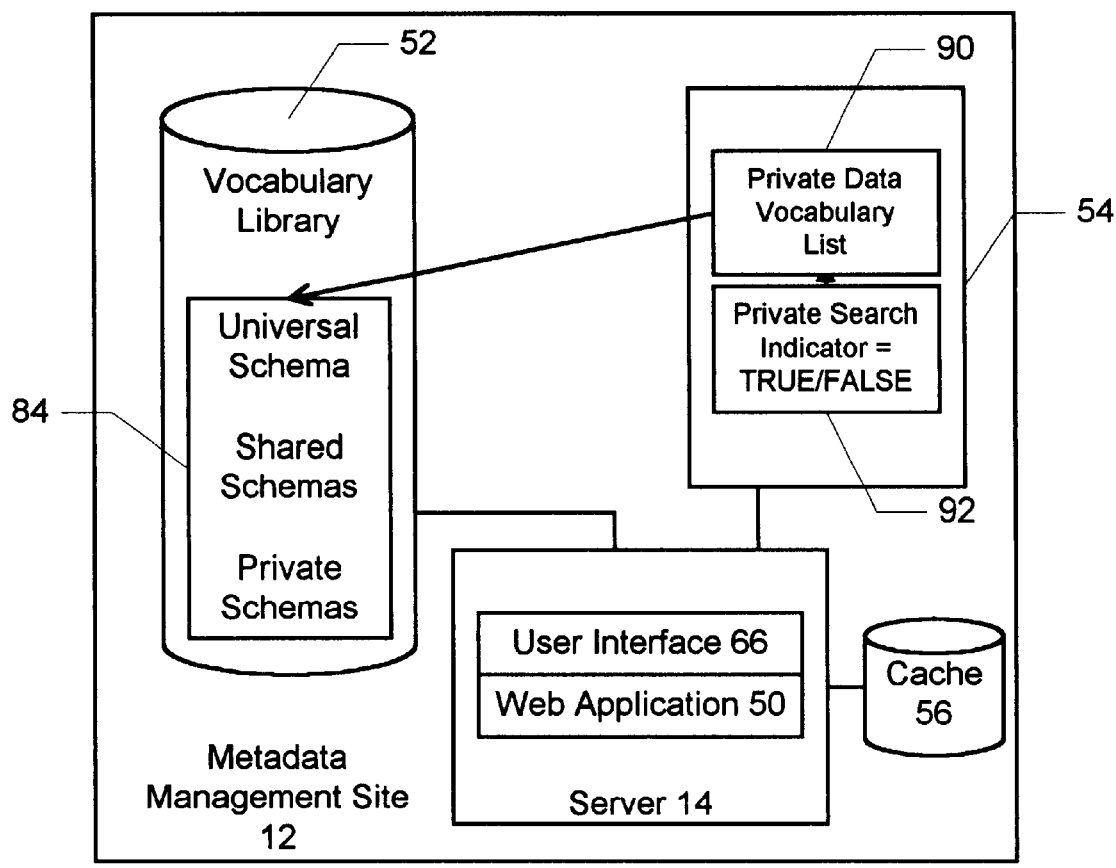
FIG. 2 is a block diagram illustrating the contents of the central site peer server.

FIG. 2 is a block diagram illustrating the contents of the central site peer server 14. In a preferred embodiment, the peer server 14 includes a web server application 50, a metadata vocabulary library 52, a user and group account database 54, and a cache 56.

The web server application 50 serves pages formatted to suit the capabilities of the peer node 16. The web server application 50 includes a form-driven user interface 66 that provides users 18 with an easy and intuitive way to define custom metadata vocabularies 84 without specifying the syntax for knowing the underlying schema language.

The metadata vocabulary library 52 is for storage and management of metadata vocabularies 84 or schemas. The vocabulary library 52 stores both custom metadata vocabularies 84 created by the users 18, as well as actual metadata values associated with specific images 22 and uploaded from client computers 16.

In a preferred embodiment, the vocabulary library 52 includes a universal schema, shared schemas, and private schemas, which in a preferred embodiment are defined using RDF and XML. All images 20 in the system 10 are required to have associated with them metadata 22 specified by the universal schema. Each metadata vocabulary 84 specifies the metadata properties in that vocabulary and specifies constraints that must be enforced in order to comply with the vocabulary. Users 18 and groups are allowed to define their own schemas, which may include the universal schema and may borrow from other vocabularies 84.

The cache 56 is used to store the metadata 22 associated with frequently accessed images 20 to provide for quicker searches. The metadata 22 may be automatically replaced in the cache 56 with the metadata 22 from other images 20 based on the peer server's configured caching policies.

The user and group account database 54 stores user account and corresponding contact information and preferences of each registered user 18. Groups of users may also share common policies, which may include permission settings, UI options, required and optional metadata vocabularies, subscriptions lists, event/notification policies, and caching policies.

The user account database 54 allows mandatory vocabularies 84 to be associated with certain target resources. For example, a particular user 18 may want all of his individual photographs to have a certain set of metadata 22 always supplied. His/her account would be configured to indicate the assignment of metadata supporting the relevant metadata vocabulary 84 is required before the image 20 may be stored on the system 10. An example of required metadata, might be a vocabulary 84 for data about the owner of the account (e.g., name, address, etc). Multiple vocabularies 84 may be required for any given target types.

Digital still Images 20 need not be the only type of target resources. Examples of other types of image files for which required vocabularies may be specified include multiple image files, such as timelapse images, burst images, panorama images, etc. Non-image target resources may also be supported, such as sound files, movies, and text documents. The present invention applies to any resource that could conceivably have metadata associated with it.

It should be noted that use of the vocabulary library 52 is not required to implement the present invention, but is preferred. In this case, each user account record includes the necessary information needed to support two levels of privacy.

According to a preferred embodiment of the present invention, each user account record maintained by the peer server 14 includes a private data vocabulary list 90 and a private search indicator 92. The private data vocabulary list 90 identifies which metadata vocabularies 84 the peer node 16 makes use of. For each metadata vocabulary 84 listed, the user account would also include a list of corresponding properties (not shown).

The private search indicator 92 is used to indicate whether or not the user wishes to reveal which metadata vocabularies 84 are used by the images stored on the user's peer node 16. In a preferred embodiment, the private search indicator 92 is a Boolean that is set to (TRUE) if the peer node 16 maintains private metadata 22, and is set to (FALSE) if the peer node's metadata 22 is public. In the case where the private search indicator 92 is TRUE, indicating private metadata 22, the user of the peer node has the option of using one of two levels of privacy to protect their private metadata 22.

In the first level of privacy, the peer node 16 is specifies to the peer server 14 which metadata vocabularies 84 the peer node supports (i.e., which vocabularies 84 are used by the images 20 on the peer node 16). Search queries received by the peer server 14 that use these vocabularies 84 are then sent to the peer node 16 and the peer node 16 handles the search, while searches that don't contain properties from the vocabularies 84 supported by a peer node 16 are processed by the server 14. While some privacy is lost in the first level, the benefit is improved performance because searches that don't contain properties from vocabularies supported by a peer node 16 are not sent to the peer node 16 for processing.

In the second level of privacy (the higher level), the peer node 16 does not specify to the peer server 14 which metadata vocabularies 84 peer node 16 supports. In this case, the private data vocabulary list 90 maintained on the server for the user of the peer node 16 will be empty, and the server 14 will pass all searches that pass the traditional access control filters passed to the peer node 16 for processing.

Figure 3:
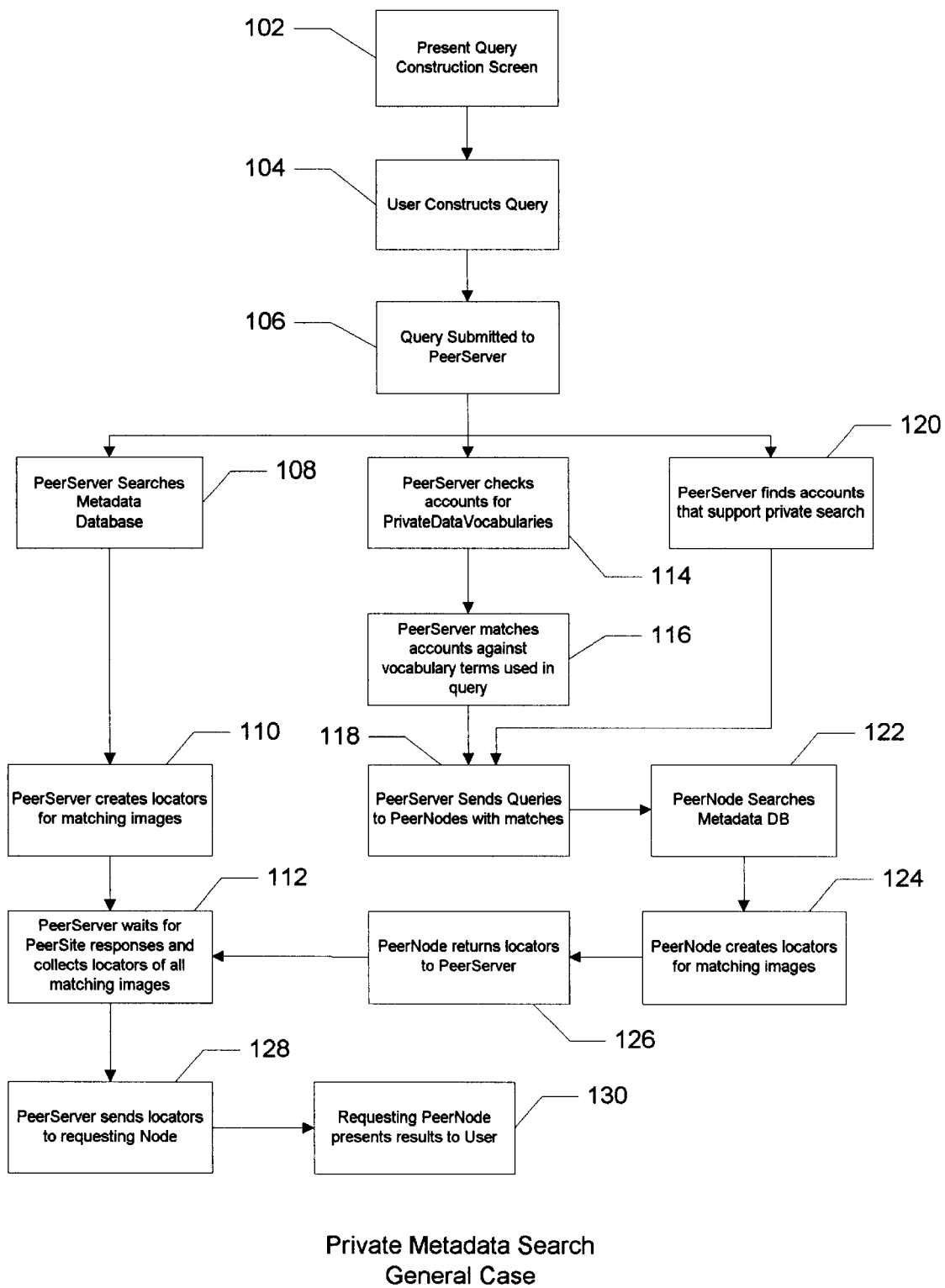

FIGS. 3–5 are flow charts illustrating three different techniques for searching for resources located throughout the system 10 using metadata, while at the same time ensuring the privacy of private metadata on the peer nodes 16. FIG. 3 illustrates a first embodiment of a general private metadata search and retrieval process where both the requesting peer node 16 and the peer nodes 16 being searched may or may not be protected by firewalls. In this embodiment, the requesting peer node 16 may be any electronic device having a web browser or client application. FIGS. 4 and 5 illustrate alternative embodiments for the private metadata search and retrieval process that provide the same functions as that shown in FIG. 3, but provide optimizations when certain firewall conditions are met. These processes may yield better performance than the general method illustrated in FIG. 3.

Referring now to FIG. 3, the process for enabling private metadata searches begins with the peer server 14 presenting a screen(s) to the peer node 16 that allows a user to construct a search query in step 102 to locate a desired image or other resource in the system 10. Preferably, the peer server 14 displays a list of metadata vocabularies 84 supported by the system 10 for user selection. In step 104, the user constructs the search query by selecting which metadata vocabularies 84 to use in the search, selecting properties of interest corresponding to those vocabularies, and by supplying values for the selected properties that the system 10 will attempt to find matches for.

In response to the user finishing construction of the query, the peer node 16 submits the query to the peer server 14 in step 106. As shown in FIG. 3, the peer server then performs three separate activities (in any sequence or in parallel) in steps 108, 114, and 120, which are the initial steps in each of these three respective activities.

The first activity begins in step 108, where the peer server 14 searches the metadata cache 56 containing metadata 22 sent to it by the peer nodes 16. For each resource which matches the query string and to which the querying user has authorization to access, the peer server 14 creates a resource locator in step 110 that the requesting peer node 16 will use to access the resource. In step 112, the peer server 14 waits for the three activities begun in steps 108, 114, and 120 to complete.

The second activity begins in step 114, where the peer server 14 searches the user account records 54 to find peer nodes 16 that maintain private metadata 22, and that have specified which metadata vocabularies 84 their resources (e.g., images) make use of. In step 116, the peer server 14 matches the search query against the listed vocabularies 84. When the peer server 14 finds a user account record with a match, the peer server sends the query to the corresponding peer node 16 for final processing in step 118.

The third activity begins in step 120, where the peer server 14 locates all user account records 54 that indicate private metadata 22 is supported, but have not identified any metadata vocabularies 84 to the peer server 14. For each matching user account 54, the peer server 14 sends the query to the corresponding peer nodes 16 for processing in step 118.

Each peer node 16, which receives the search query, searches its private metadata 22 database for matching resources in step 122. For each matching resource, the peer node 16 creates a resource locator in step 124, and returns it to the peer server 14 in step 126. The peer server 14 waits for these responses in step 112. In an alternative embodiment, the peer node 16 that processed the search query could return any resource locators directly to the peer node 16 that requested the search, assuming that the peer server 14 sends the URL of the requesting peer node 16 to the other peer nodes 16 when passing the search query.

When the peer server 14 receives all the responses to the query from the peer nodes 16 for (or the requests timeout) in step 112, the peer server 14 sends the resource locators for all the matching resources to the requesting peer node 16 in step 128. The requesting peer node 16 then uses the received resource locators to retrieve the desired data.

Note: To completely hide any information returned from the peer nodes 16, the peer nodes 16 must encrypt their responses. In a preferred embodiment this is done using a public key associated with the requesting peer node 16. This key can be obtained by the peer nodes 16 in a number of ways. In a preferred embodiment, the requesting peer node 16 sends the key to the peer server 14 along with the search query. The peer server 14 then sends the key to each peer node 16 it forwards the query to. In another embodiment, public keys could be stored in a well-known location from which the peer nodes 16 can retrieve it. Examples of such well-known repositories are LDAP directories, a certificate authority such as Versign, and the peer server 14 itself. Each peer node 16 would encrypt its responses to query requests. These requests can only be unencrypted with the requesting peer node's private key.

FIG. 4 is a flow chart illustrating a second embodiment for the private metadata search and retrieval process, which is optimized for peer nodes 16 unprotected by firewalls. Like the process illustrated in FIG. 3, this process functions despite the presence of firewalls protecting the peer nodes 16. This process, however, in most cases will provide better performance for peer nodes 16 that are not behind firewall than the method illustrated in FIG. 3, but the requesting peer node 16 may or may not be behind a firewall. The search and retrieval process provides additional privacy in that query responses are not routed through the peer server 14, rather the responses are sent directly to the requesting peer node 16. It may also provide better performance than queries processed by the process of FIG. 3 in cases where the peer server 14 is processing a great deal of requests and responses. Data encryption in this method can be provided by methods most commonly used today (e.g., SSL connections).

The search and retrieval process of FIG. 4 begins with the system 10 presenting a user 18 with a screen(s) that allows the user 18 to construct a query in step 202. In step 204, the user 18 constructs the search query by selecting the metadata vocabularies 84 to use, selecting the properties of interest, and supplying values for the properties that the system 10 will attempt to find matches for. In response to the user finishing construction of the query, the peer node 16 submits the query to the peer server 14 in step 206. The peer server 14 then performs three separate activities (in any sequence or in parallel) in steps 208, 214, and 220, which are the initial steps in each of these three respective activities.

The first activity begins in step 208, where the peer server 14 searches the metadata cache 56 containing metadata 22 sent to it by the peer nodes 16. For each resource which matches the query string and to which the querying user has authorization to access, the peer server 14 creates a resource locator in step 210 that the requesting peer node 16 will use to access the resource. In step 212, the peer server 14 waits for the three activities begun in steps 208, 214, and 220 to complete.

The second activity begins in step 214, where the peer server 14 searches the user account records 54 to find peer nodes 16 that maintain private metadata 22, and have specified which metadata vocabularies 84 their resources (e.g., images) make use of. In step 216, the peer server 14 matches the search query against the listed vocabularies. When the peer server 14 finds a record with a match it builds a peer node locator containing the query sent by the requesting client in step 218.

In step 220, the peer server 14 locates all peer node account records that indicate they support private metadata 22 and where the vocabularies 84 have not been identified to the peer server 14. When peer server 14 finds a record for a peer node 16 having vocabularies 84 containing properties matching those in the search query, the peer server 14 creates respective peer node locator pointing to each of those peer nodes 16 and embeds the query in the peer node locators in step 218.

After finishing constructing all the peer node locators with the embedded query in step 218, the peer server 14 provides the peer node locators to the waiting process of step 212.

When the peer server 14 receives all the peer node locators (or the requests timeout) in step 212, the peer server 14 sends the peer node locators to the requesting peer node 16 in step 222. In step 224, the requesting peer node 16 then uses the returned peer node locators to send the query to the peer nodes 16 identified in the resource locators. (Note: peer nodes 16 behind firewalls could be supported by indicating in each peer node locator that the query should be routed through a Peer Proxy).

In response to receiving one of the resource locators, each peer node 16 searches its metadata database to find resources that match the query in step 226. For each matching resource found, the peer node 16 creates a peer node locator in step 228. In step 230 the peer node returns any created peer node locators to the requesting peer node 16. Finally, in step 232 the requesting peer node 16 uses the peer node locators to retrieve the resources and presents the results of the query to the user.

FIG. 5 is a flow chart illustrating a third embodiment for the private metadata search and retrieval process, which is optimized for peer nodes protected by firewalls. While this process is operational for both peer nodes 16 that are, and are not, protected by firewalls, the process provides no real benefit over the process in FIG. 4 for peer nodes 16 that are not protected firewalls. The requesting peer node 16 may or may not be protected a firewall. Like the process in FIG. 4, this process provides additional privacy over the process shown in FIG. 3 in that query responses are not routed through the peer server 14. It may also provide better performance than queries processed by the method in FIG. 3 in cases where the peer server 14 is processing a great deal of requests and responses. Data encryption in this method can be provided by methods most commonly used today (e.g., SSL connections).

The search and retrieval process begins the same as the previous two embodiments with a screen being presented to the user 18 (step 302) and the user 18 constructing a search query (step 304). Once the requesting peer node 16 submits the query to the peer server 14 (step 306), the peer server 14 performs the three activities initially started in steps 308, 316, and 322.

The first activity begins in step 308, where the peer server 14 searches the metadata cache 56 containing metadata 22 sent to it by the peer nodes 16. For each resource which matches the query string and to which the querying user has authorization to access, the peer server 14 creates a resource locator in step 310 that the requesting peer node 16 will use to access the resource. In step 312 the peer server 14 sends all the resource locators to the requesting peer node 16.

The second activity begins in step 316, where the peer server 14 searches the user account records 54 to find peer nodes 16 that maintain private metadata 22, and that have specified which metadata vocabularies 84 their resources (e.g., images) make use of. In step 318, the peer server 14 matches the search query against the listed vocabularies. When the peer server 14 finds a user account record with a match, the peer server 14 forwards the query to the corresponding peer node 16 along with a resource locator for the requesting peer node 16 in step 320.

The third activity begins in step 322, where the peer server 14 locates all user account records 54 that indicate private metadata 22 is supported, but have not identified any metadata vocabularies 84 to the peer server 14. For each matching user account 54, the peer server 14 sends the query to the corresponding peer nodes 16 along with a resource locator for the requesting peer node 16 in step 320.

Each peer node 16, which receives the search query, searches its private metadata 22 database for matching resources in step 324. For each matching resource, the peer node 16 creates a resource locator in step 326. In step 328, each peer node 16 using the resource locator of the requesting peer node 16 received from the peer server 14 establishes a network connection with the requesting peer node 16. Each peer node 16 uses this connection to send the resources locators it has created to the requesting peer node 16. The connection is left open to allow the requesting peer node 16 to make requests, if needed.

In step 314, the requesting peer node 16 collects all the resource locators from the peer server 14 and peer nodes 16. After the requesting peer node 16 either receives all resource locators or a timeout period expires, the requesting peer node 16 uses the resource locators to retrieve the data needed to present the results of the query to the user.

A peer-to-peer photosharing service has been disclosed that maintains privacy over user metadata and images. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for executing searches for resources that span more than one private resource repository in a restricted-access resource sharing system comprising at least one server and multiple peer nodes connected to a network, the resource sharing network for storing resources, including data digital images, and for retrieving the resources based on metadata associated with the resources, the method comprising the steps of:

(a) maintaining storage of resources and associated metadata on respective peer nodes, wherein the associated metadata is based on at least one metadata vocabulary;
 (b) allowing each of the peer nodes to indicate to the server that the metadata vocabularies associated with the resources are designated as private, thereby becoming a restricted access peer node;
 (c) if a first restricted access peer node specifies to the server which metadata vocabularies the first restricted access peer node supports, providing a first level of privacy whereby search queries received by the server that use the specified metadata vocabularies are passed to the first respective restricted access peer nodes for processing, while searches that do not use the specified vocabularies are processed by the server; and
 (d) if the first restricted access peer node does not specify to the server which metadata vocabularies the first restricted access peer node supports, providing a second level of privacy whereby search queries received by the server are passed to the first respective restricted access peer nodes for processing.

2. The method of claim 1 further including the step of: routing responses generated by the first restricted access peer node in response to a particular search query to a requesting peer node through the server.

3. The method of claim 1 further including the step of: routing responses generated by the first restricted access peer node in response to a particular search query directly to a requesting peer node without going through the server.

4. The method of claim 3 wherein step (c) further includes the steps of:

(i) embedding the search query in a locator for the first restricted access peer node;
 (ii) sending the locator to requesting peer node;
 (iii) using the locator to send the query to the first restricted access peer node;
 (iv) in response to receiving the query on the first restricted access peer node, searching the stored metadata on the first restricted access peer node for a match; and
 (v) returning resource locators for resources having metadata that match the query to the requesting peer node.

5. The method of claim 3 wherein step (c) further includes the step of:

(i) sending search queries to the first restricted access peer node with a locator for the requesting peer node so that the first restricted access peer node can send search results directly to the requesting peer node.

6. The method of claim 1 further including the step of: encrypting the responses sent from the first restricted access peer node.

7. The method of claim 6 further including the step of: encrypting the responses using a public key associated with the requesting peer node.

8. A method for executing searches for resources that span more than one private resource repository in a restricted-access resource sharing system comprising at least one server and multiple peer nodes connected to a network, the resource sharing network for storing resources, including data digital images, and for retrieving the resources based on metadata associated with the resources, the method comprising the steps of:

(a) maintaining storage of resources and associated metadata on respective peer nodes, wherein the associated metadata is based on at least one metadata vocabulary;
 (b) allowing each of the peer nodes to indicate to the server that the metadata vocabularies associated with the resources are designated as private, thereby becoming a restricted access peer node;
 (c) receiving on the server a search query for a resource from a requesting peer node, wherein the search query uses one or more of the metadata vocabularies therein;
 (d) determining by the server which of the restricted access peer nodes have specified to the server which metadata vocabularies the respective restricted access peer node supports;

(e) executing the search query on each of the restricted access peer nodes that have specified to the server which metadata vocabularies are supported and where the specified metadata vocabularies match the metadata vocabularies used in the search query, wherein after executing the search query, those restricted access peer nodes send a list of resource locators for resources matching the search query to the requesting node;

(f) executing the search query on the server for each of the restricted access peer nodes that have specified to the server which metadata vocabularies are supported, but where the specified metadata vocabularies do not match the metadata vocabularies used in the search query, wherein after executing the search query, the server sends a list of resource locators for resources matching the search query to the requesting node; and (g) executing the search query on each of the restricted access peer nodes that have not specified to the server which metadata vocabularies are supported, wherein after executing the search query, each of those peer nodes returns a list of resource locators for resources matching the search query to the requesting node.

9. The method of claim 8 further including the step of: encrypting the responses sent from the restricted access peer nodes.

10. The method of claim 9 further including the step of: encrypting the responses using a public key associated with the requesting peer node.

* * * * *